US007398378B2

(12) United States Patent
Sugure et al.

(10) Patent No.: US 7,398,378 B2
(45) Date of Patent: Jul. 8, 2008

(54) ALLOCATING LOWER PRIORITY INTERRUPT FOR PROCESSING TO SLAVE PROCESSOR VIA MASTER PROCESSOR CURRENTLY PROCESSING HIGHER PRIORITY INTERRUPT THROUGH SPECIAL INTERRUPT AMONG PROCESSORS

(75) Inventors: Yasuo Sugure, Kodaira (JP); Kenta Morishima, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 88 days.

(21) Appl. No.: 11/453,902

(22) Filed: Jun. 16, 2006

(65) Prior Publication Data

US 2006/0294348 A1 Dec. 28, 2006

(30) Foreign Application Priority Data

Jun. 22, 2005 (JP) ............................. 2005-182289

(51) Int. Cl.
*G06F 9/44* (2006.01)
(52) U.S. Cl. ........................................ 712/244; 710/260
(58) Field of Classification Search .................. None
See application file for complete search history.

(56) References Cited

U.S. PATENT DOCUMENTS 6,711,643 B2 * 3/2004 Park et al. .................... 710/260

6,772,241 B1 * 8/2004 George et al. ................ 710/36

FOREIGN PATENT DOCUMENTS

JP 2000-305917 A 11/2000

* cited by examiner

*Primary Examiner*—Kenneth S Kim
(74) *Attorney, Agent, or Firm*—Miles & Stockbridge P.C.

(57) ABSTRACT

In a multi-processor system with a master-slave configuration, interrupts are efficiently allocated and processed between the processors to improve a real-time performance. A master processor (MP) provided with an operating system (OS), a slave processor (SP), an interrupt controller (INTC), and an interrupt among processors control register (IPCR) are connected to one another. The INTC has an interrupt among processors request control logic for master processor (IPRCLMP), an interrupt among processors request control logic for slave processor (IPRCLSP), and an interrupt among processors disable judgment logic for master processor (IPDJLMP). When the SP finishes the interrupt process after the MP has executed an interrupt process higher in priority and the SP has executed an interrupt process lower in priority, the IPDJLMP determines whether or not other interrupt requests have arrived and outputs an interrupt request from the SP to the MP according to the determination result.

5 Claims, 11 Drawing Sheets

| FLAG | FUNCTION | SIGNAL VALUE | CONTENTS |
|---|---|---|---|
| B1 | PRESENCE OR ABSENCE OF INTERRUPT AMONG PROCESSORS REQUEST | 0 | NOT REQUESTED |
| B1 | PRESENCE OR ABSENCE OF INTERRUPT AMONG PROCESSORS REQUEST | 1 | REQUESTED |
| B2 | PRESENCE OR ABSENCE OF DISABLEMENT OF INTERRUPT AMONG PROCESSORS | 0 | NOT DISABLED |
| B2 | PRESENCE OR ABSENCE OF DISABLEMENT OF INTERRUPT AMONG PROCESSORS | 1 | DISABLED |

FIG. 13

| INPUT (PRIORITY) | | | OUTPUT DESTINATION |
|---|---|---|---|
| STARTED TASK | TASK EXECUTED BY MASTER PROCESSOR | TASK EXECUTED BY SLAVE PROCESSOR | |
| FIRST | NONE | NONE | SLAVE |
| FIRST | SECOND | NONE | SLAVE |
| SECOND | FIRST | NONE | SLAVE |
| FIRST | NONE | SECOND | MASTER |
| SECOND | NONE | FIRST | MASTER |
| FIRST | SECOND | THIRD | SLAVE |
| FIRST | THIRD | SECOND | MASTER |
| SECOND | FIRST | THIRD | SLAVE |
| SECOND | THIRD | FIRST | MASTER |
| THIRD | FIRST | SECOND | QUEUE |
| THIRD | SECOND | FIRST | QUEUE |

FIG. 14

| BIT | FUNCTION | SIGNAL VALUE | CONTENTS |
|---|---|---|---|
| B1 | PRESENCE OR ABSENCE OF INTERRUPT AMONG PROCESSORS REQUEST | 0 | NOT REQUESTED |
| | | 1 | REQUESTED |
| B2 | PRESENCE OR ABSENCE OF DISABLEMENT OF INTERRUPT AMONG PROCESSORS | 0 | NOT DISABLED |
| | | 1 | DISABLED |
| B3 | PRIORITY LEVEL OF INTERRUPT AMONG PROCESSORS | — | PRIORITY LEVEL OF INTERRUPT AMONG PROCESSORS |

ALLOCATING LOWER PRIORITY INTERRUPT FOR PROCESSING TO SLAVE PROCESSOR VIA MASTER PROCESSOR CURRENTLY PROCESSING HIGHER PRIORITY INTERRUPT THROUGH SPECIAL INTERRUPT AMONG PROCESSORS

CROSS-REFERENCE TO RELATED APPLICATION

The present application claims priority from Japanese Patent Application No. JP 2005-182289 filed on Jun. 22, 2005, the content of which is hereby incorporated by reference into this application.

TECHNICAL FIELD OF THE INVENTION

The present invention relates to a multi-processor system. More particularly, it relates to a technology effectively applied to the configuration of an interrupt control unit of an asymmetric multi-processor system including a master processor mounted with an operating system (hereinafter referred to as "OS"), a slave processor, and others.

BACKGROUND OF THE INVENTION

The inventors of the present invention have examined the following technologies for a multi-processor system.

In the field of a conventional embedded microprocessor, increase in an operating frequency and improvement in a logical method have achieved both of the performance improvement and the reduction in power consumption. With the increase in the frequency of the processor, however, due to the increase in the operating power and the increase in the standby power consumption resulting from leakage current, the improvement in the operating frequency without increasing the power consumption has been approaching its limit. In such a circumstance, as means for achieving the improvement in performance of an information processing device and the reduction in power consumption thereof, a multi-processor system has shown great promise, in which a plurality of conventional processors are mounted on a chip to perform processes in parallel, thereby providing a high computing performance without increasing operating frequency.

The multi-processor system is divided into two types: symmetric multiple processor (SMP) and asymmetric multiple processor (ASMP). The SMP refers to a symmetric multi-processor having a configuration in which a plurality of processors share one OS and one memory, and the plurality of processors to be mounted are treated as equivalent and arbitrary processors execute general processes. Since the SMP can achieve the general performance improvement, it is applied to a high end server and a personal computer (PC). However, the SMP is not suited for an embedded microprocessor requiring a high real-time performance because an interrupt response time of OS adapted to the SMP is long.

Meanwhile, the ASMP refers to an asymmetric multi-processor having a configuration in which individual processors have their own memory and OS, and each of a plurality of mounted processors plays a specific role for operation. The ASMP is mainly applied to embedded microprocessors to utilize the existing software asset and to reduce the number of development processes. However, if an OS is mounted on each processor, since a memory area has to be provided for each OS process, the cost is correspondingly increased. For this reason, it is possible to provide a multi-processor system at low cost by providing a master-slave configuration including a master processor with OS and a slave processor without OS as an ASMP configuration mounted with one OS.

In order to apply the multi-processor system with such a master-slave configuration to a field of embedded equipment control in which higher real-time performance is required, a mechanism for efficiently allocating interrupt processes to each of the processors is needed. For a conventional multi-processor system with a master-slave configuration, for example, Japanese Patent Application Laid-Open Publication No. 2000-305917 (Patent Document 1) discloses a method of allocating interrupt requests so that a master processor performs a time-series process and a non-master processor performs a non time-series process.

SUMMARY OF THE INVENTION

Incidentally, the examination by the inventors of the present invention has revealed the following facts regarding the technology for the multi-processor system.

In the patent document 1 described above, on-chip peripheral circuits for outputting interrupt requests themselves designate a processor to perform the interrupt process from a master processor and other processors and output a signal corresponding thereto to the interrupt controller. Therefore, the interrupt controller allocates the interrupt processes according to instructions from the on-chip peripheral circuits which output the interrupt requests irrespective of loading state in the processors. Consequently, since the interrupt processes are allocated without considering the operating state of each processor, it is difficult to efficiently allocate the interrupt processes.

The above and other objects and novel characteristics of the present invention will be apparent from the description of this specification and the accompanying drawings.

The typical ones of the inventions disclosed in this application will be briefly described as follows.

More specifically, a multi-processor system according to the present invention comprises: a master processor provided with an OS; a slave processor operating according to instructions from the master processor; a plurality of on-chip peripheral circuits; an interrupt among processors control register for retaining information to request an interrupt among processors or to disable an interrupt among processors; and an interrupt controller for determining a priority of a process of an interrupt request from an external circuit or the on-chip peripheral circuits, and then outputting the interrupt request to the master processor or the slave processor, wherein a task process based on the interrupt request is allocated to and processed in the master processor or the slave processor, the interrupt controller includes: an interrupt among processors request control logic for slave processor for outputting the interrupt request from the master processor to the slave processor; and an interrupt among processors request control logic for master processor for outputting the interrupt request from the slave processor to the master processor, and the master processor and the slave processor perform the interrupt process in parallel.

Also, a multi-processor system according to the present invention comprises: a master processor provided with an OS; and a slave processor operating according to instructions from the master processor, wherein, when the slave processor finishes the interrupt process after the master processor has executed an interrupt process higher in priority and the slave processor has executed an interrupt process lower in priority respectively in parallel, it is determined whether other interrupt requests exist and an interrupt request is outputted from the slave processor to the master processor according to the result thereof.

The effect obtained by typical aspects of the present invention will be briefly described below.

That is, it is possible to improve the real-time performance.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 11:
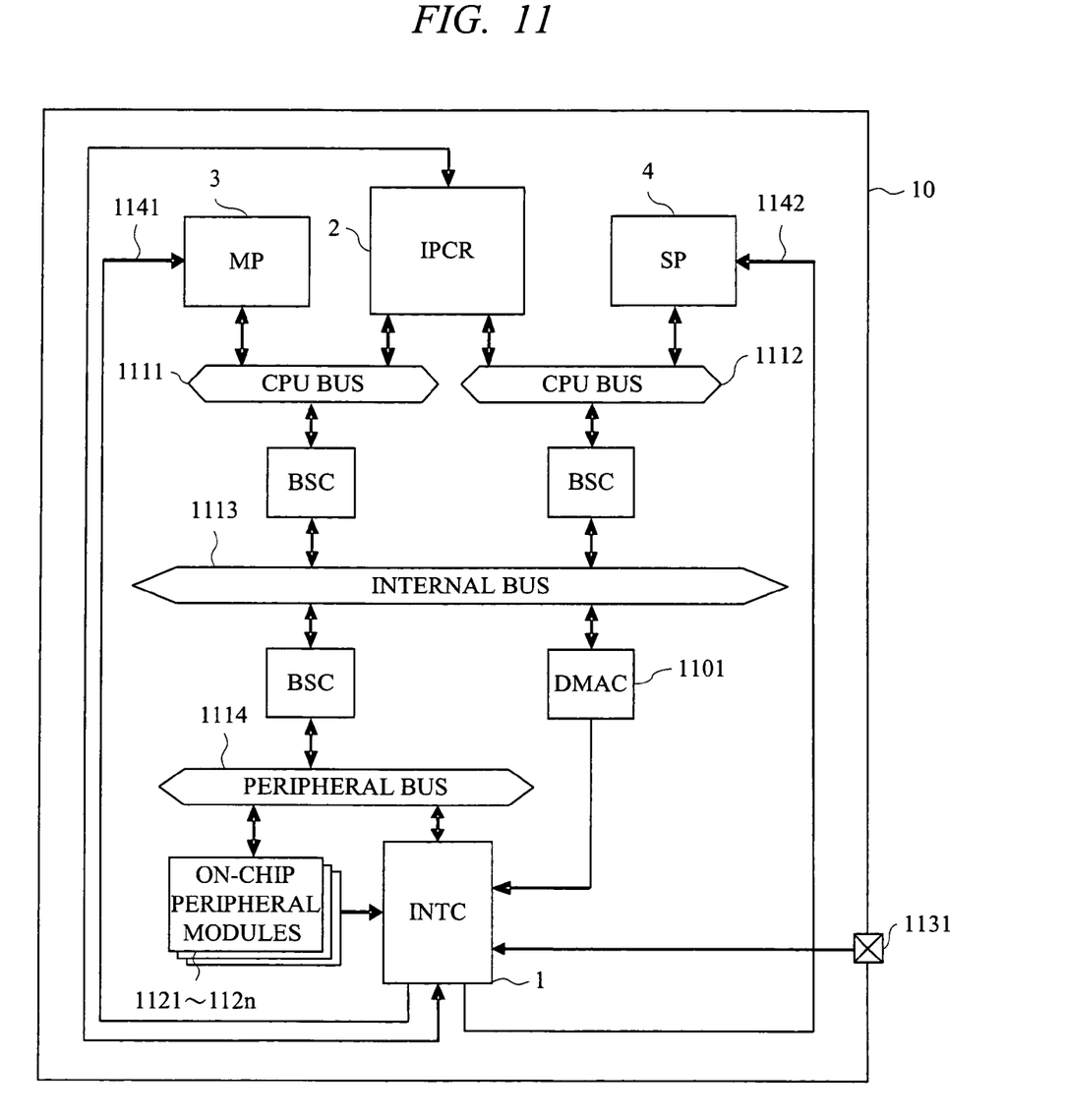
FIG. 11 is a block diagram showing a configuration of the multi-processor system according to the first or the second embodiment of the present invention.

FIG. 11 is a block diagram showing a configuration of a multi-processor system according to the first embodiment of the present invention.

First, one example of a configuration of the multi-processor system according to the first embodiment will be described with reference to FIG. 11. A multi-processor system 10 according to the first embodiment is, for example, a semiconductor integrated circuit (LSI) formed on one semiconductor substrate, and it is composed of an interrupt controller (INTC) 1, an interrupt among processors control register (IPCR) 2, a master processor (MP) 3, a slave processor (SP) 4, a direct memory access controller (DMAC) 1101, on-chip peripheral modules 1121 to 112n, CPU buses 1111 and 1112, an internal bus 1113, a peripheral bus 1114, a BSC, and others. The interrupt controller 1 controls interrupt requests to the master processor 3 and the slave processor 4.

The master processor 3 and the slave processor 4 are connected to the CPU bus 1111 and the CPU bus 1112, respectively. Also, the interrupt among processors control register 2 is connected to the CPU buses 1111 and 1112 without being mounted on the INTC 1. This is because, if the IPCR 2 is mounted in the INTC 1, since the processor has to access the register in the INTC 1 via the CPU bus, the internal bus and the peripheral bus at the time of setting the register, the number of cycles required until the register is set is increased. On the other hand, when the IPCR 2 is connected to the CPU buses 1111 and 1112, since the processor can access the register only via the CPU bus at the time of setting the register, the number of cycles required until the register is set can be decreased compared with the IPCR 2 mounted in the INTC 1.

The INTC 1 is connected to the peripheral bus 1114 together with on-chip peripheral modules 1121 to 112n such as input/output devices (I/O) operating at lower speed than the internal bus 1113.

Next, the outline of an interrupting operation in the multi-processor system according to the first embodiment will be described. As shown in FIG. 11, when the INTC 1 receives interrupt requests from a plurality of interrupt generating sources such as the on-chip peripheral modules 1121 to 112n, the direct memory access controller (DMAC) 1101 and an external terminal 1131, it selects the highest priority request from the interrupt requests received from the interrupt generating sources based on the rule set in advance in the register in the INTC 1 or the interrupt among processors control register 2, and then sends it to the master processor 3 through an interrupt signal line 1141 and to the slave processor 4 through an interrupt signal line 1142, respectively.

Figure 1:
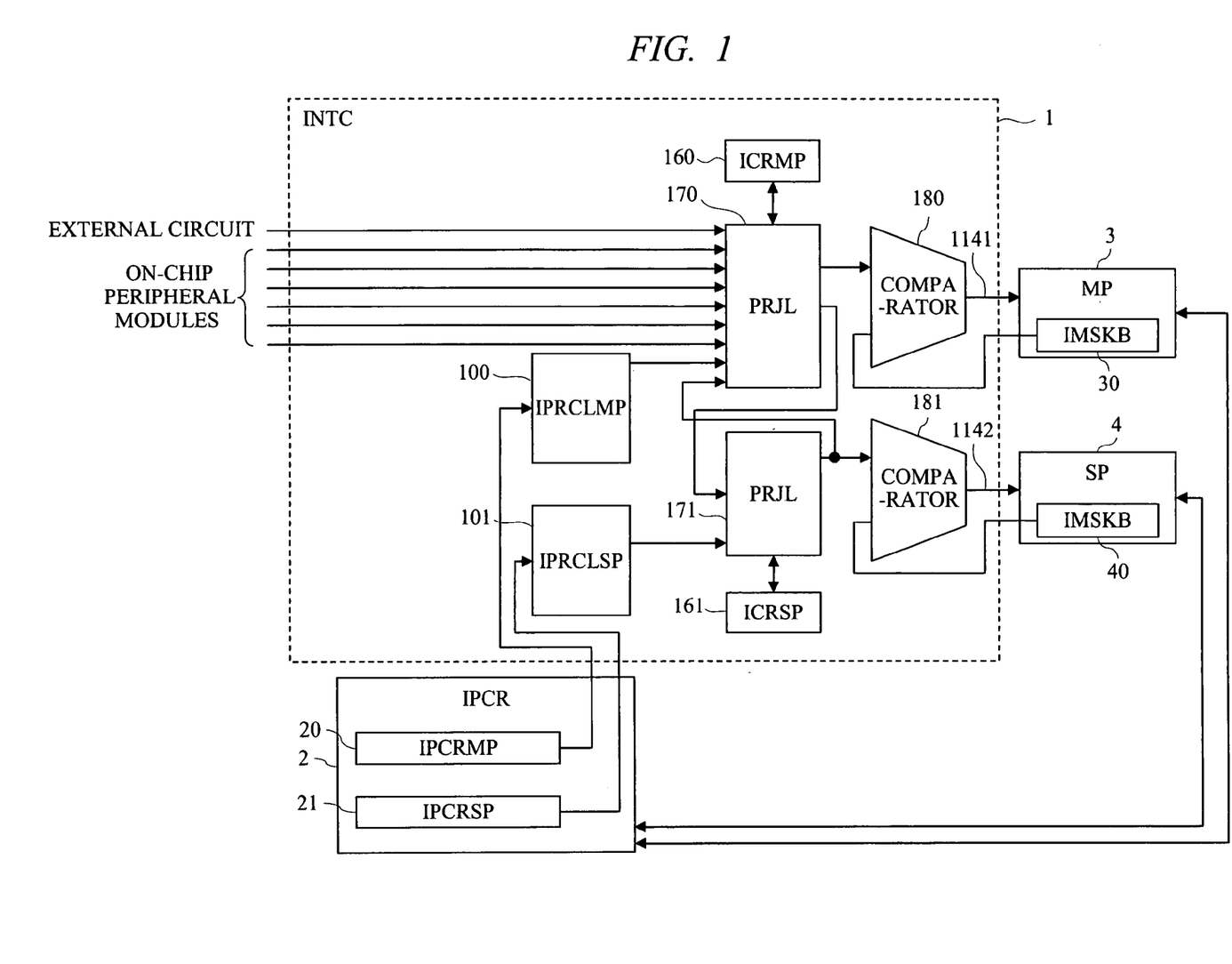
FIG. 1 is a block diagram showing a detailed configuration of a part of the interrupt controller in a multi-processor system according to the first embodiment of the present invention.

FIG. 1 is a block diagram showing a detailed configuration of a part of the interrupt controller in the multi-processor system according to the first embodiment. The interrupt controller (INTC) 1 in the multi-processor system 10 according to the first embodiment is composed of an interrupt among processors request control logic for master processor (IPRCLMP) 100, an interrupt among processors request control logic for slave processor (IPRCLSP) 101, an interrupt control register for master processor (ICRMP) 160, an interrupt control register for slave processor (ICRSP) 161, priority ranking judgment logics (PRJL) 170 and 171, comparators 180 and 181, and others. Also, the interrupt among processors control register (IPCR) 2 includes an interrupt among processors control register for master processor (IPCRMP) 20 and an interrupt among processors control register for slave processor (IPCRSP) 21 and retains information about interrupt requests among the processors. Further, the master processor (MP) 3 is provided with an interrupt mask bit (IMSKB) 30 and the slave processor (SP) 4 is provided with an interrupt mask bit (IMSKB) 40, respectively.

Figure 3:
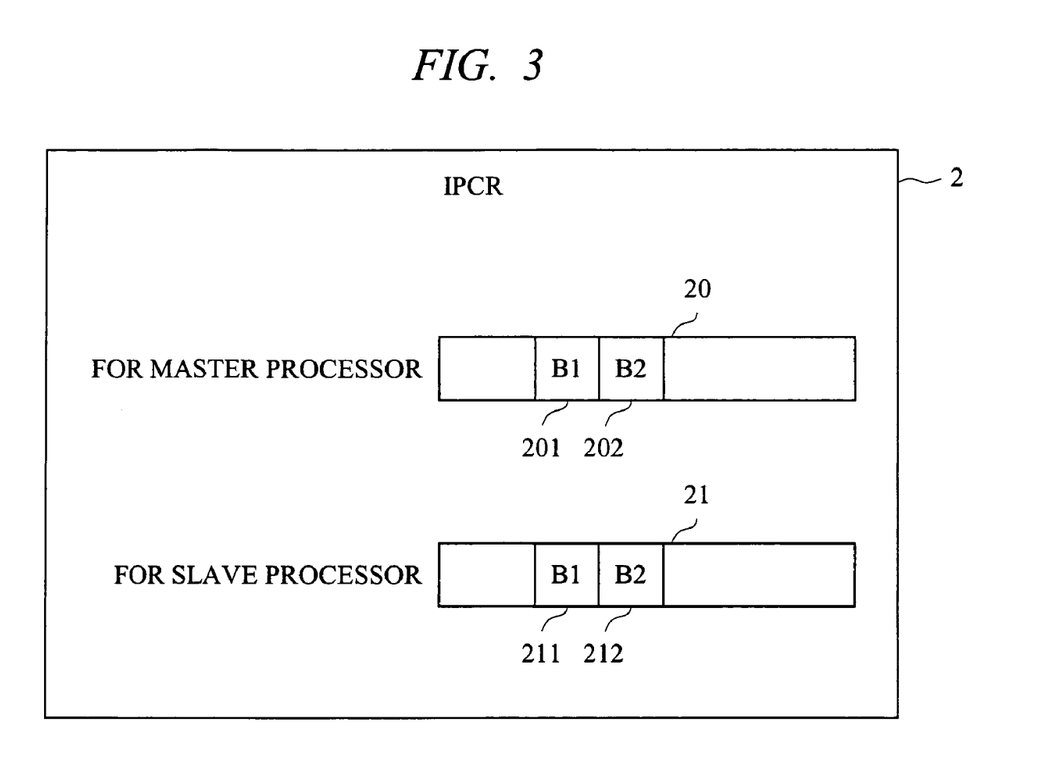
FIG. 3 is a diagram showing the detailed configuration of the interrupt among processors control register in the multi-processor system according to the first embodiment of the present invention.
Figure 12:
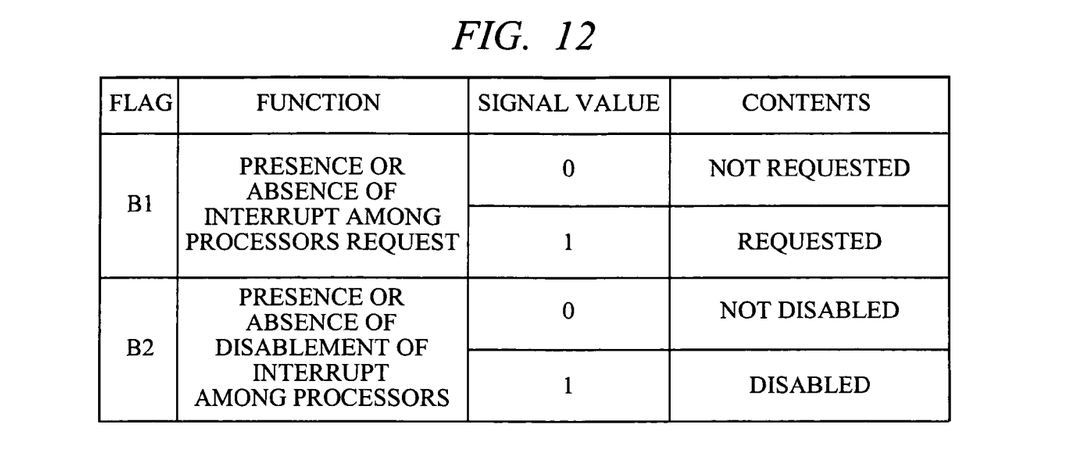
FIG. 12 is a diagram showing a detailed specification of bits arranged in the interrupt among processors control register in the multi-processor system according to the first embodiment of the present invention.

FIG. 3 shows a detailed configuration of the interrupt among processors control register (IPCR) 2 according to the first embodiment. Also, FIG. 12 shows detailed specifications of bits arranged in the interrupt among processors control register 2.

In the interrupt among processors control register 2, areas for designating one-bit bits B1 and B2 are provided for each of the master processor and the slave processor. In the example in FIG. 3, the interrupt among processors control register for master processor 20 has a B1 bit 201 and a B2 bit 202, and the interrupt among processors control register for slave processor 21 has a B1 bit 211 and a B2 bit 212.

The B1 bit has a function to show the presence or absence of a request for interrupt among processors. For example, a signal value of "1" signifies the presence of a request for interrupt among processors and a signal value of "0" signifies the absence of a request for interrupt among processors.

On the other hand, the B2 bit has a function to show the presence or absence of disablement of the interrupt among processors. For example, a signal value of "1" signifies the disablement of the interrupt among processors and a signal value of "0" signifies that the interrupt among processors is not disabled. According to the above specifications, for example, when the interrupt among processors from the master processor 3 to the slave processor 4 is to be requested, the B1 bit 211 of the interrupt among processors control register for slave processor 21 is set to "1" and the B2 bit 212 thereof is set to "0".

The master processor 3 and the slave processor 4 are provided with the interrupt mask bits 30 and 40, respectively, and execute the interrupt process when an interrupt level is higher than the interrupt mask bits.

Since the slave processor 4 executes the interrupt process in accordance with the process instructed by the master processor 3, it is started by an interrupt among processors from the master processor 3.

In order to output the interrupt requests to the master processor 3, the INTC 1 is equipped with the priority ranking judgment logic 170 for selecting the highest priority interrupt from interrupts requested by a plurality of interrupt request sources, the interrupt control register for master processor 160 for retaining the information required to determine the priority, and the comparator 180 for comparing the level of the highest priority interrupt selected by the priority ranking judgment logic 170 with the interrupt mask bit 30 in the master processor 3. When the requested interrupt level is higher than the interrupt mask bit 30, the INTC 1 can request the interrupt to the master processor 3.

Similarly, in order to output the interrupt requests to the slave processor 4, the INTC 1 is equipped with the priority ranking judgment logic 171 for selecting the highest priority interrupt from interrupts requested by a plurality of interrupt request sources, the interrupt control register for slave processor 161 for retaining the information required to determine the priority, and the comparator 181 for comparing the level of the highest priority interrupt selected by the priority ranking judgment logic 171 with the interrupt mask bit 40 in the slave processor 4. When the requested interrupt level is higher than the interrupt mask bit 40, the INTC 1 can request the interrupt to the slave processor 4.

The allocation of processes between the master processor 3 and the slave processor 4 is performed through the interrupt among processors. The interrupt from the slave processor 4 to the master processor 3 is controlled by the interrupt among processors request control logic for master processor 100 with reference to register information in the interrupt among processors control register for master processor 20, and an interrupt among processors request signal is outputted to the priority ranking judgment logic 170. On the other hand, the interrupt from the master processor 3 to the slave processor 4 is controlled by the interrupt among processors request control logic for slave processor 101 with reference to register information in the interrupt among processors control register for slave processor 21, and an interrupt among processors request signal is outputted to the priority ranking judgment logic 171.

Next, an operational flow of the processes from the request of an interrupt to the execution of a task corresponding to the interrupt in the multi-processor system with master-slave configuration according to the first embodiment will be described with reference to FIG. 4.

Figure 4:
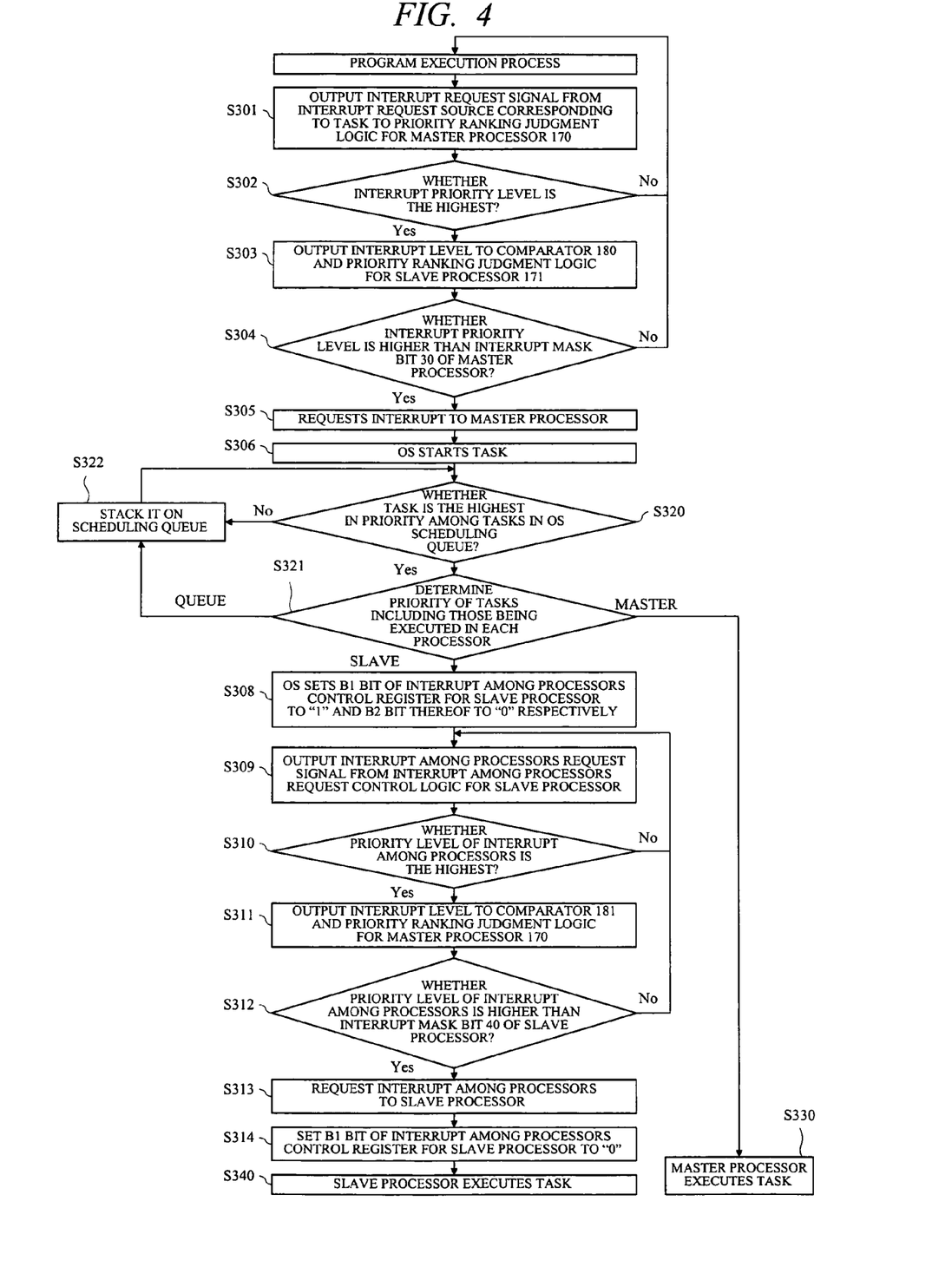
FIG. 4 is a diagram showing an operational flow of processes from the request of an interrupt to the execution of a task corresponding to the interrupt in the multi-processor system according to the first embodiment of the present invention.

First, an interrupt request signal is sent from an interrupt request source corresponding to a task to the priority ranking judgment logic for master processor 170 in the INTC 1 (Step S301 in FIG. 4). The priority ranking judgment logic for master processor 170 determines whether or not the interrupt level of the received interrupt request signal is the highest in priority in accordance with the interrupt control register for master processor 160 (Step S302 in FIG. 4). When the priority is not the highest, the interrupt process is not performed, and a normal program execution process is performed instead. When the priority is the highest, the priority ranking judgment logic for master processor 170 outputs an interrupt level corresponding to the task to the comparator 180 and the priority ranking judgment logic for slave processor 171 (Step S303 in FIG. 4).

The comparator 180 compares the priority level of the interrupt selected by the priority ranking judgment logic for master processor 170 with the interrupt mask bit 30 of the master processor 3 (Step S304 in FIG. 4). When the priority level of the selected interrupt is not higher than the interrupt mask bit 30 of the master processor 3, the interrupt process is not performed and a normal program execution process is performed instead. When it is higher than that, the interrupt request signal is outputted to the master processor (Step S305 in FIG. 4). The master processor 3 which has received the interrupt request signal informs the OS mounted thereon of the reception of the signal, and then, the OS which has received the information starts the task (Step S306 in FIG. 4). Subsequently, it is determined whether the started task is the highest in priority among tasks stacked on the scheduling queue of the OS (Step S320 in FIG. 4). When the priority is not the highest, the started task is stacked on the scheduling queue (Step S322 in FIG. 4). On the other hand, when the priority is the highest, the priority of the tasks being executed in each processor and the started task is determined (Step S321 in FIG. 4).

Figure 13:
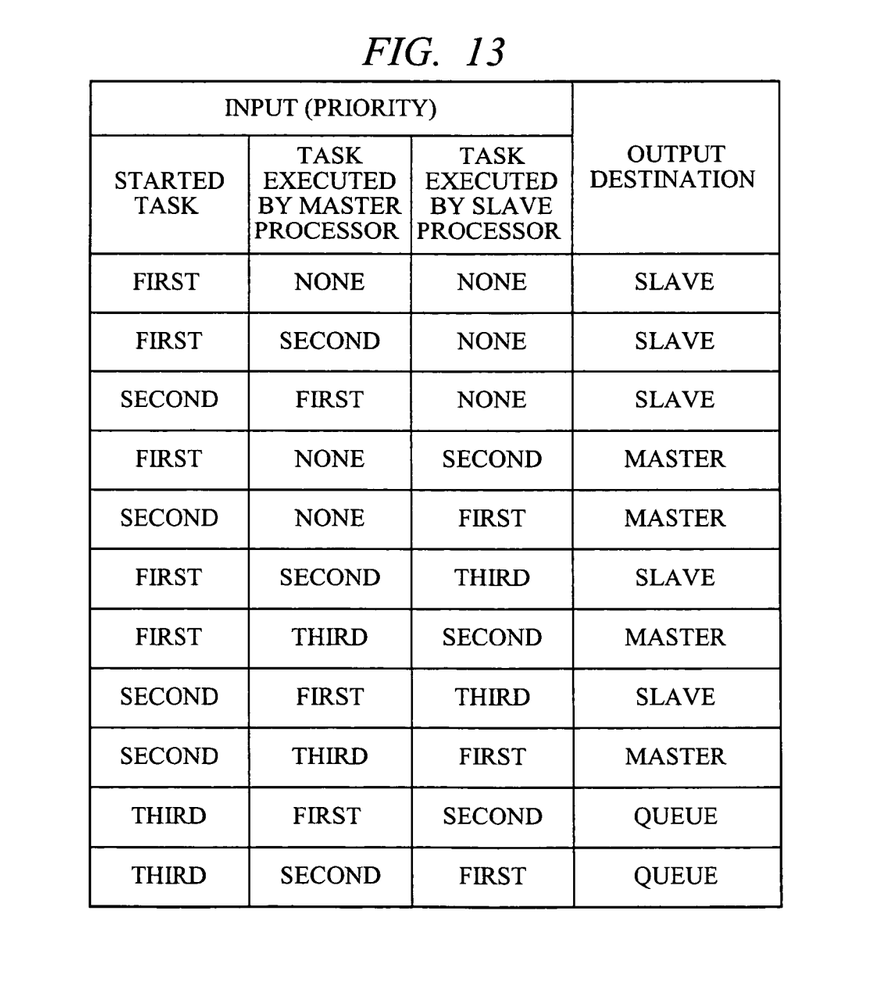
FIG. 13 is a table showing conditions for determining priority in the multi-processor system according to the first embodiment of the present invention.

FIG. 13 shows the conditions for the priority determination. The fundamental policy of the conditions for determination is given by the following three points: (1) when the master processor 3 or the slave processor 4 is not executing a task, the processor that is not executing any task executes a started task, and when neither the master processor 3 nor the slave processor 4 is executing a task, the slave processor executes a started task; (2) when both the master processor 3 and the slave processor 4 are executing a task, the processor which is executing a task with the lowest priority between the master processor 3 and the slave processor 4 executes a started task; and (3) when the started task is lower in priority than any other tasks being executed by the processors, the started task is stacked on the scheduling queue of the OS.

Based upon the policy described above, a started task process is executed by the master processor 3, a started task process is executed by the slave processor 4, or a started task is stored in the scheduling queue depending on the priority of the three tasks, that is: a started task; a task being executed by the master processor 3; and a task being executed by the slave processor 4. When it is determined that the started task process is executed by the mater processor 3, the started task process is executed by the master processor 3 (Step S330 in FIG. 4). When it is determined that the started task process is executed by the slave processor 4, the OS of the slave processor 4 sets the B1 bit 211 of the interrupt among processors control register for slave processor 21 to "1" and the B2 bit 212 thereof to "0", respectively (Step S308 in FIG. 4) and causes the interrupt among processors request control logic for slave processor 101 to send an interrupt among processors request signal to the priority ranking judgment logic for slave processor 171 (Step S309 in FIG. 4).

The priority ranking judgment logic for slave processor 171 determines whether the interrupt level of the received interrupt request signal is the highest in priority in accordance with the interrupt control register for slave processor 161 (Step S310 in FIG. 4). When the priority is not the highest, the interrupt process is not performed, and the flow returns to the step S309 while being in an acceptance waiting state. When the priority is the highest, the priority ranking judgment logic for slave processor 171 outputs the interrupt level corresponding to the task to the comparator 181 and the priority ranking judgment logic for master processor 170, respectively (Step S311 in FIG. 4).

The comparator 181 compares the priority level of the interrupt selected by the priority ranking judgment logic for slave processor 171 with the interrupt mask bit 40 of the slave processor 4 (Step S312 in FIG. 4). When the priority level of the selected interrupt is not higher than the interrupt mask bit 40 of the slave processor 4, the interrupt process is not performed, and the flow returns to the step S309 while being in an acceptance waiting state. Meanwhile, when it is higher than that, the comparator 181 outputs the interrupt request signal to the slave processor 4 (Step S313 in FIG. 4), and the B1 bit 211 of the interrupt among processors control register for slave processor 21 is cleared to "0" (Step S314 in FIG. 4). Through the processes described above, the slave processor 4 executes the task (Step S340 in FIG. 4).

Next, an operational flow of the processes in which a task corresponding to the interrupt is executed, the OS finishes the task, and then the rescheduling is performed in the multiprocessor system with the master-slave configuration according to the first embodiment will be described with reference to FIG. 5.

The master processor 3 will be described first. After the master processor 3 has finished the execution of a task, the OS finishes the task (Steps S330 and S331 in FIG. 5). Thereafter, the rescheduling is performed, thereby managing the process order of the tasks to be subsequently processed (Step S360 in FIG. 5).

Subsequently, the slave processor 4 will be described. Immediately before the slave processor 4 finishes the execution of a task, the B1 bit 201 of the interrupt among processors control register for master processor 20 is set to "1" and the B2 bit 202 thereof to "0" (Step S341 in FIG. 5). Thereafter, the slave processor 4 finishes the execution of the task (Step S342 in FIG. 5) and the interrupt is requested from the slave processor 4 to the master processor 3 in order to finish the task of the OS. Specifically, the interrupt among processors request signal is sent from the interrupt among processors request control logic for master processor 100 to the priority ranking judgment logic for master processor 170 (Step S343 in FIG. 5).

Figure 5:
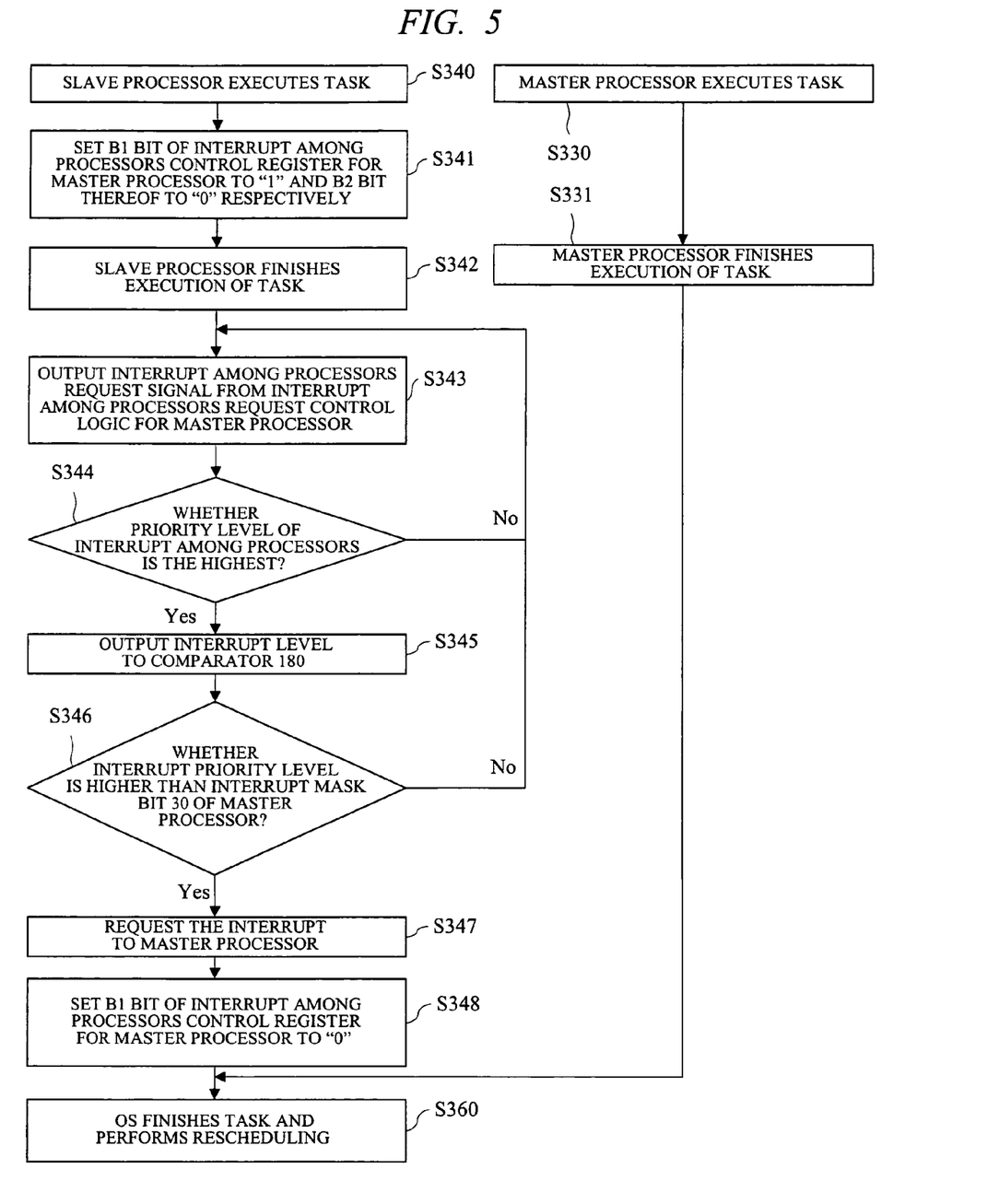
FIG. 5 is a diagram showing an operational flow of processes in which a task corresponding to an interrupt is executed, the OS finishes the task, and the rescheduling is performed in the multi-processor system according to the first embodiment of the present invention.

The priority ranking judgment logic for master processor 170 determines whether the interrupt level of the received interrupt request signal is the highest in priority in accordance with the interrupt control register for master processor 160 (Step S344 in FIG. 5). When the priority is not the highest, interrupt process is not performed, and the flow returns to the step S343 while being in an acceptance waiting state. When the priority is the highest, the priority ranking judgment logic for master processor 170 outputs the interrupt level corresponding to the task to the comparator 180 (Step S345 in FIG. 5).

The comparator 180 compares the priority level of the interrupt selected by the priority ranking judgment logic for master processor 170 with the interrupt mask bit 30 of the master processor 3 (Step S346 in FIG. 5). When the priority level of the selected interrupt is not higher than the interrupt mask bit 30 of the master processor, the interrupt process is not performed, and the flow returns to the step S343 while being in an acceptance waiting state. Meanwhile, when it is higher than that, the comparator 180 outputs the interrupt request signal to the master processor 3 (Step S347 in FIG. 5), and the B1 bit 201 of the interrupt among processors control register for master processor 20 is cleared to "0" (Step S348 in FIG. 5). Through the processes described above, the OS finishes the task and the rescheduling is performed, thereby managing the process order of the tasks to be subsequently processed (Step S360 in FIG. 5).

Figure 6:
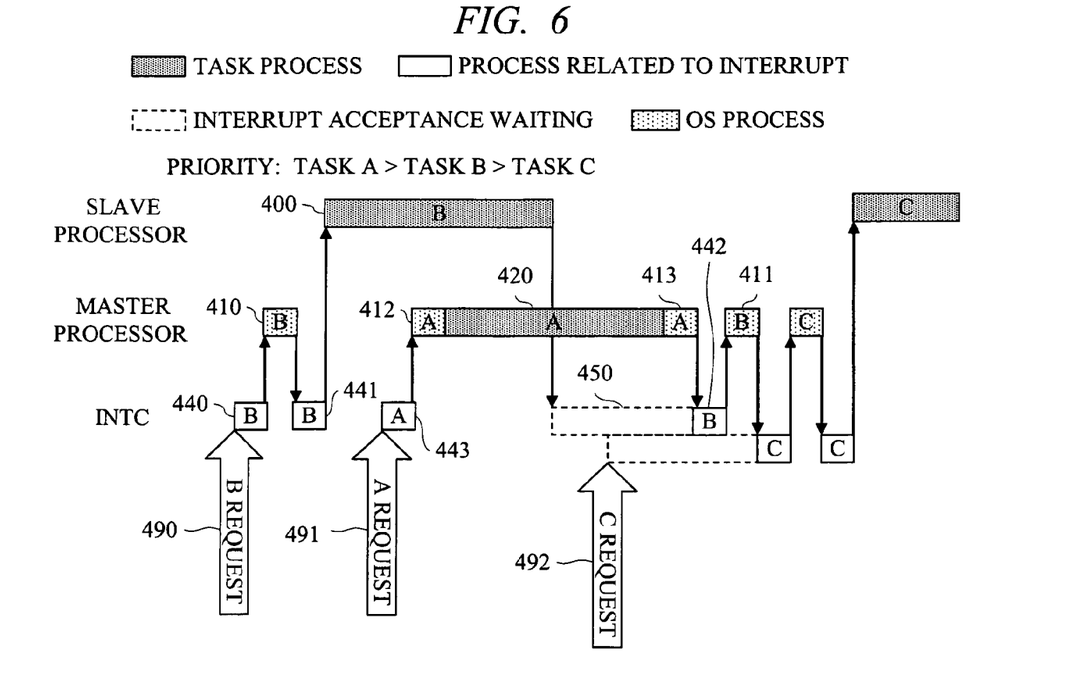
FIG. 6 is a diagram showing a flow of an interrupt allocation process in the master-slave configuration in the multi-processor system according to the first embodiment of the present invention.

A process flow of interrupt allocation in the master-slave configuration according to the first embodiment will be described with reference to FIG. 6. In FIG. 6, for the task priority, a task A is taken to be the highest in priority, and the priority is high in order of a task B and a task C. Also, it is assumed that the slave processor 4 is started from a non-activated state.

First, an interrupt request 490 corresponding to the task B is given to the INTC 1. Thereafter, the priority is determined according to the operational flow of the steps S302 to S305 in FIG. 4 and the interrupt request corresponding to the task B is outputted to the master processor 3 at 440. The master processor 3 receives the interrupt request according to the operational flow of the step S306 in FIG. 4 at 410, and the OS mounted on the master processor 3 starts the task B. Thereafter, since the slave processor is not activated, it is determined to allocate the process of the task B to the slave processor 4 according to the operational flow of the steps S320 to S308 in FIG. 4, and an interrupt among processors is set to the slave processor 4. The INTC 1 requests the interrupt among processors to the slave processor 4 at 441 according to the operational flow of the steps S309 to S314 in FIG. 4. Then, the slave processor 4 executes the task B at 400.

While the slave processor 4 is executing the task B, an interrupt request 491 corresponding to the task A is given to the INTC 1. Thereafter, at 443, the priority is determined according to the operational flow of the steps S302 to S305 in FIG. 4. Since the task A is higher in priority than the task B, an interrupt request corresponding to the task A is outputted to the master processor 3. The master processor 3 receives the interrupt request according to the operational flow of the step S306 in FIG. 4 at 412, and the OS mounted on the master processor 3 starts the task A. Thereafter, since the master processor 3 is not activated, it is determined that the process of the task A is allocated to the master processor 3 according to the operational flow of the steps S320 to S330 in FIG. 4. Then, the master processor 3 executes the task A at 420. When the execution of the task B being processed by the slave processor 4 is finished while the master processor 3 is executing the task A, an interrupt among processors from the slave processor 4 to the master processor 3 is requested according to the operational flow of the steps S341 to S343 in FIG. 5. After that, since the task B is lower in priority than the task A according to the step S344 in FIG. 5, the flow does not advance to the steps subsequent to the step S345 in FIG. 5 and it reaches a state of awaiting an interrupt request 450. This state 450 continues until the master processor 3 has finished the task A, the OS performs the finish process of the task A, and the rescheduling is performed at 413. Furthermore, even if an interrupt 492 corresponding to the task C which is lower in priority than the task A is generated during the execution of the task A, the interrupt request for the task C is kept in a waiting state. When the task A is finished, since the task B becomes the highest in priority, the flow can advance to the steps after the step S345 in FIG. 5. An interrupt among processors from the slave processor 4 to the master processor 3 is requested according to the operational flow until the step S348 in FIG. 5 in order to notify the OS mounted on the master processor 3 of the finish of the task B at 442. Then, the OS performs the finish process of the task B and the rescheduling is performed at 411. Thereafter, the task C whose interrupt request has been kept in a waiting state is executed by the available slave processor 4.

As described above, the interrupt processes can be allocated to and executed by the master processor 3 and the slave processor 4 in parallel. However, when the master processor 3 performs a task higher in priority than that of the slave processor 4, even if the slave processor 4 finishes a task process faster than the master processor 3, an interrupt request is to be kept in a waiting state, and thus, the improvement in a real-time interrupt process cannot be achieved. Also, when the slave processor 4 cannot rapidly finish a task process, it is impossible to quickly allocate the process to the slave processor 4. Therefore, even though the interrupt process can be allocated to and executed in parallel in the master processor 3 and the slave processor 4, the effect of the configuration cannot be fully utilized, and thus there is still room for improvement.

Figure 7:
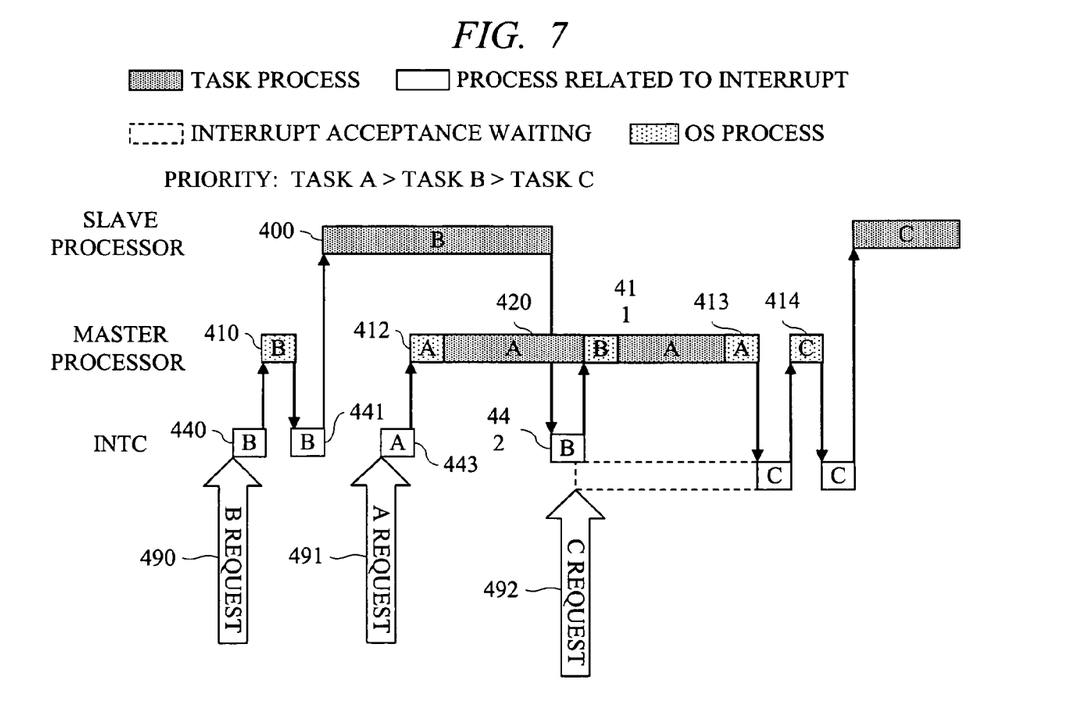
FIG. 7 is a diagram showing a flow of an interrupt allocation process in the master-slave configuration in the multi-processor system according to the first embodiment of the present invention.

For this reason, a priority level of the interrupt among processors is set to the top priority level among the uniquely maskable interrupts instead of the priority level of a task allocated to the slave processor 4. A process flow of the interrupt allocation in the master-slave configuration at this time will be described with reference to FIG. 7. The block diagram showing this configuration is the same as that in FIG. 1, and the operational flow at this time is the same as those in FIG. 4 and FIG. 5. Note that, in FIG. 7, a task A is taken to be the highest in priority, and the priority is high in order of a task B and a task C. Also, it is assumed that the slave processor is started from a non-activated state. In FIG. 7, the same reference numerals and characters as those shown in FIG. 6 denote the same parts. The description of the same parts as those in FIG. 6 is omitted, and the process after the finish of 400 which is different from that of FIG. 6 will be described below.

When the execution of the task B processed by the slave processor 4 is finished while the master processor 3 is executing the task A, an interrupt among processors from the slave processor 4 to the master processor 3 is requested according to the operational flow of the steps S341 to S343 in FIG. 5. Thereafter, since the interrupt among processors is the highest in priority among the maskable interrupts according to the step S344 in FIG. 5, the flow can proceed to the steps after the step S345 in FIG. 5. An interrupt among processors from the slave processor 4 to the master processor 3 is requested in order to notify the OS mounted on the master processor 3 of the finish of the task B at 442 according to the operational flow until the step S348 in FIG. 5. Then, the master processor 3 receives the interrupt among processors at 411 and interrupts the execution of the task A, and the OS performs the finish process of the task B and the rescheduling. After the completion of 411, the master processor 3 resumes the execution of the interrupted task A. Thereafter, the master processor 3 finishes the task A, and the OS performs the finish process of the task A and the rescheduling at 413. Even if an interrupt 492 corresponding to the task C lower in priority than the task A is generated while the task A is being executed, the interrupt request for the task C is still kept in a waiting state. After the task A is finished, the available slave processor 4 executes the process of the task C whose interrupt request is kept in a waiting state.

As described above, by setting the priority of the interrupt among processors to the highest priority among the maskable interrupts, it is possible to easily receive the interrupt among processors even when the master processor 3 is executing high priority task process. As a result, since a request for interrupt among processors at 442 can be processed in parallel with the execution of task process of the master processor 3, it is possible to correspondingly reduce the processing time of the interrupt corresponding to the task C, and to shorten the total interrupt processing time.

However, as shown in FIG. 7, even when the slave processor 4 is in a stand-by state, the interrupt request corresponding to the task C is still put in a waiting state. Thus, there is still room for improvement from the viewpoint of efficient allocation of the interrupt processes between the master processor 3 and the slave processor 4.

Second Embodiment

Figure 2:
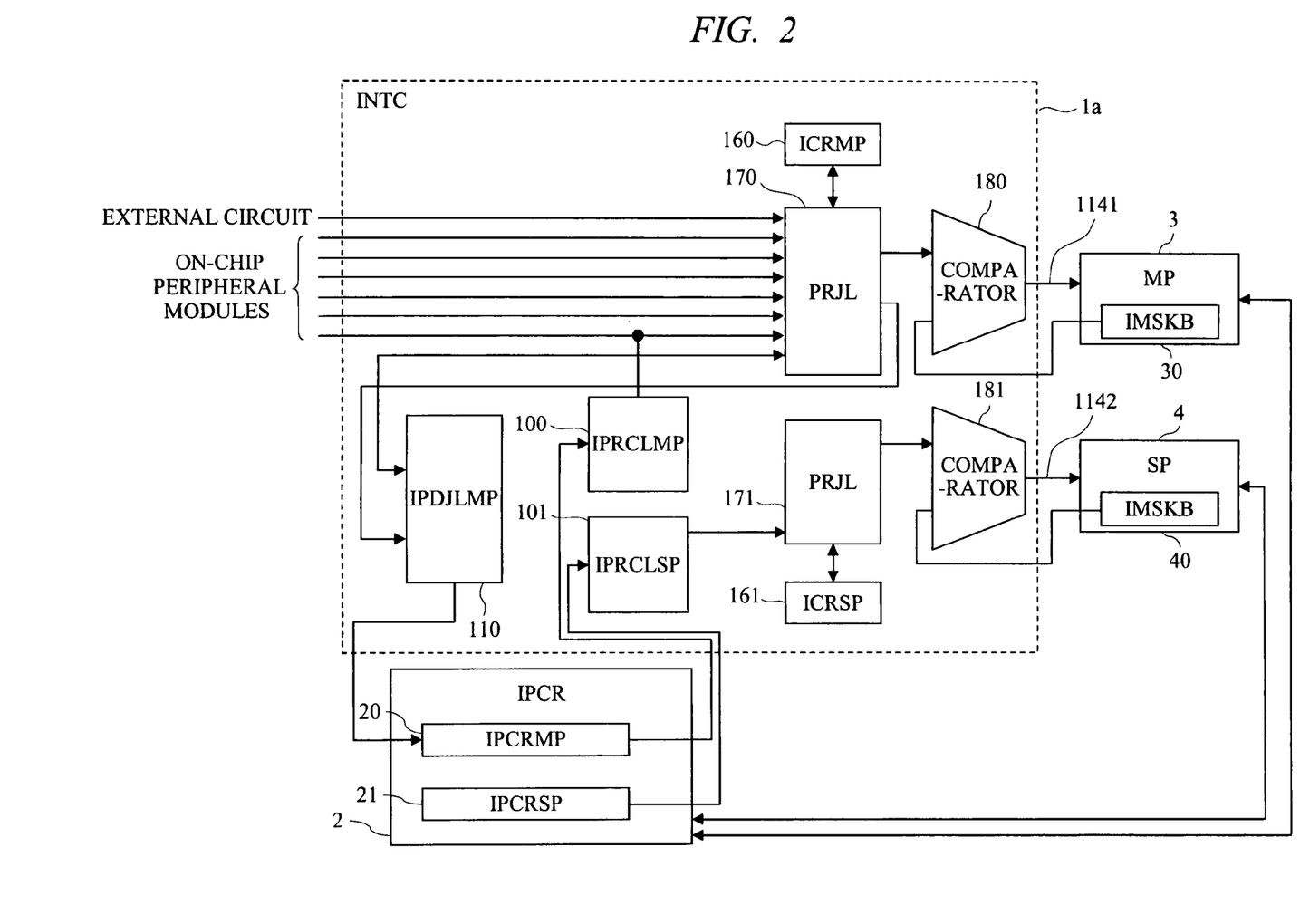
FIG. 2 is a block diagram showing a detailed configuration of a part of the interrupt controller in a multi-processor system according to the second embodiment of the present invention.

FIG. 2 is a block diagram showing a detailed configuration of a part of the interrupt controller in a multi-processor system according to the second embodiment of the present invention. In FIG. 2, the same reference numerals and characters as those in FIG. 1 denote the same parts. Note that the configuration similar to that in FIG. 11 may be taken as one example of a configuration of the multi-processor system according to the second embodiment of the present invention.

In comparison to the interrupt controller 1 according to the first embodiment in FIG. 1, an interrupt among processors disable judgment logic for master processor 110 is added to an interrupt controller (INTC) 1a according to the second embodiment of the present invention.

The master processor 3, the slave processor 4, the INTC 1, the interrupt among processors control register 2, the interrupt control register for master processor 160, the interrupt control register for slave processor 161, the priority ranking judgment logics 170 and 171, the comparators 180 and 181, the interrupt among processors request control logic for master processor 100, and the interrupt among processors request control logic for slave processor 101 have the same functions as those in FIG. 1. Therefore, the description thereof is omitted.

The interrupt among processors disable judgment logic for master processor (IPDJLMP) 110 updates the B2 bit 202 of the interrupt among processors control register for master processor 20 based on the interrupt among processors request signal from the slave processor 4 to the master processor 3 outputted by the interrupt among processors request control logic for master processor 100 and other interrupt request waiting detection signals outputted by the priority ranking judgment logic for master processor 170. Specifically, when the interrupt among processors request from the slave processor 4 to the master processor 3 is outputted and other interrupt request waiting detection signals are not outputted, the B2 bit 202 of the interrupt among processors control register for master processor 20 is updated to "1", and it is updated to "0" under other conditions.

Figure 10:
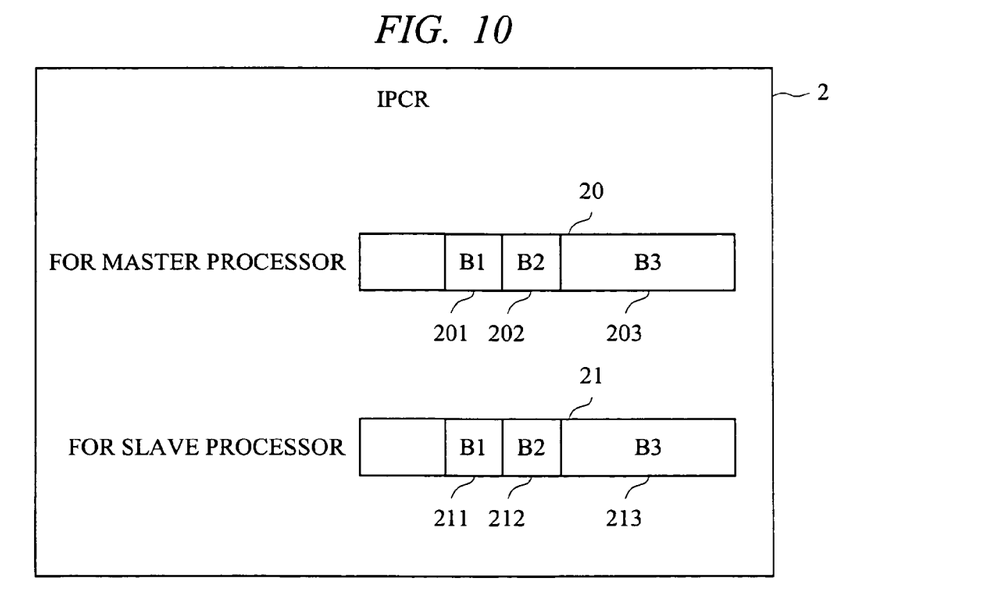
FIG. 10 is a diagram showing a detailed configuration of the interrupt among processors control register in the multi-processor system according to the second embodiment of the present invention.
Figure 14:
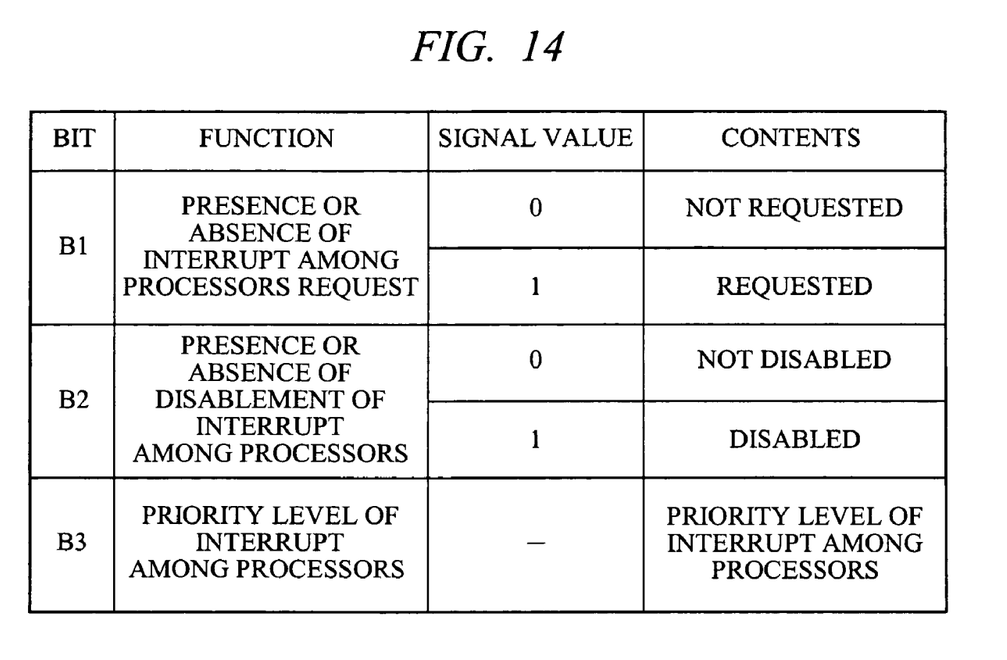
FIG. 14 is a diagram showing detailed specifications of bits arranged in the interrupt among processors control register in the multi-processor system according to the second embodiment of the present invention.

FIG. 10 shows a detailed configuration of the interrupt among processors control register 2 according to the second embodiment. Also, FIG. 14 shows a detailed specification of bits arranged in the interrupt among processors control register 2. In FIG. 10, since the parts denoted by the same reference numerals and characters as those in FIG. 3 have the same function, the description thereof is omitted. The interrupt among processors control register 2 has areas for designating B3 for each of the interrupt among processors control register for master processor 20 and the interrupt among processors control register for slave processor 21. In the example of FIG. 3, the interrupt among processors control register for master processor 20 has a B3 bit 203 in addition to a B1 bit 201 and a B2 bit 202, and the interrupt among processors control register for slave processor 21 has a B3 bit 213 in addition to a B1 bit 211 and a B2 bit 212.

The B3 bit is a priority level of interrupt among processors and can arbitrarily change the interrupt priority level.

Figure 8:
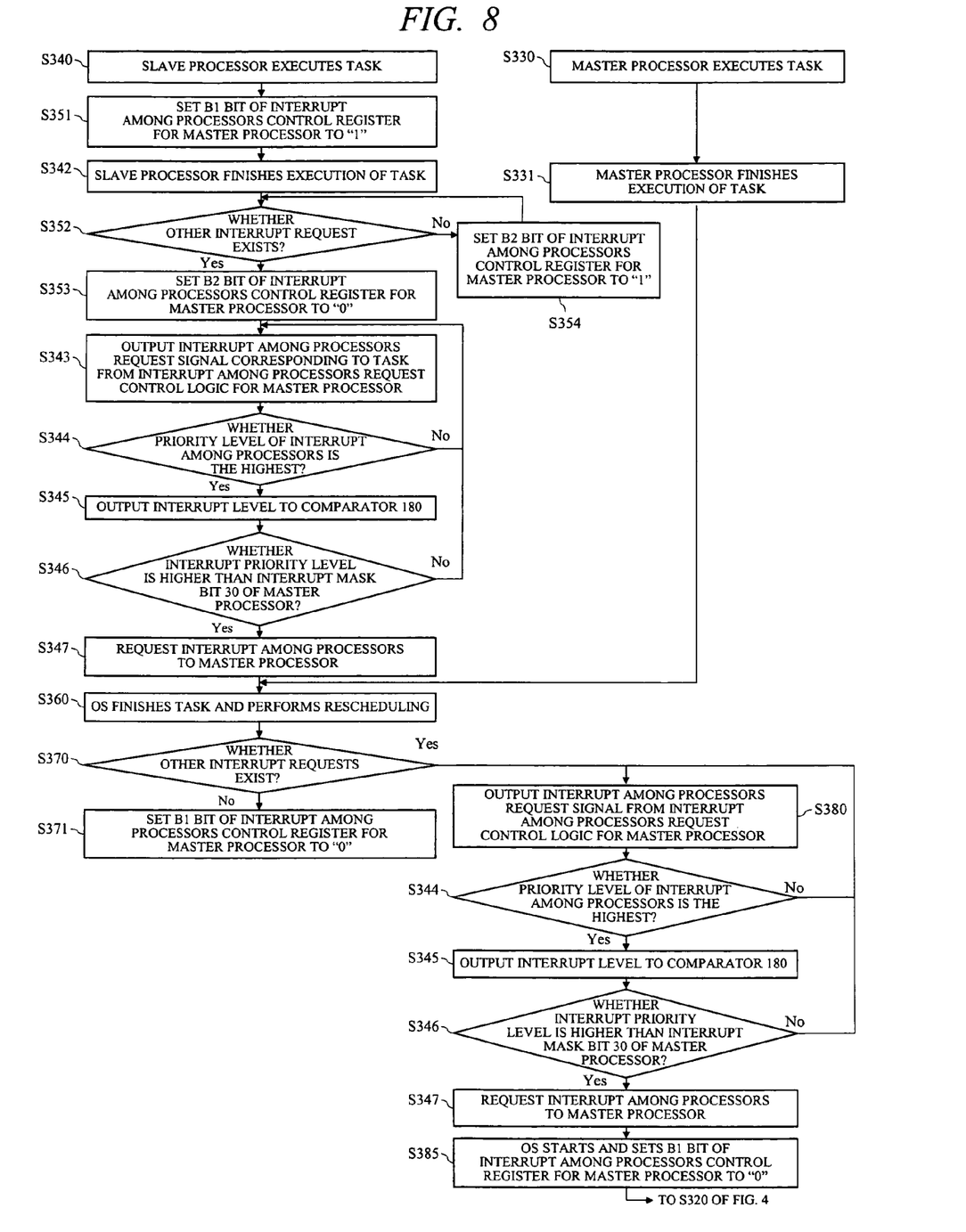
FIG. 8 is a diagram showing an operational flow of processes in which a task corresponding to the interrupt is executed, the OS finishes the task, the rescheduling is performed, and a task is started when other interrupt requests are in a waiting state in the multi-processor system according to the second embodiment of the present invention.

Next, an operational flow of the processes in which a task corresponding to the interrupt is executed, the OS finishes the task, the rescheduling is performed, and a task is started when other interrupt requests are in a waiting state in the multiprocessor system with the master-slave configuration according to the second embodiment will be described with reference to FIG. 8. In FIG. 8, the same reference numeral and characters as those in FIG. 6 denote the same parts. The description of the same parts as those in FIG. 6 is omitted, and the operational flow of the slave processor different from that in FIG. 6 will be described. Note that the operational flow from the interrupt request to the execution of a task corresponding to the interrupt is the same as that in FIG. 5.

Immediately before the slave processor 4 finishes the execution of a task, the B1 bit 201 of the interrupt among processors control register for master processor 20 is set to "1" (Step S351 in FIG. 8). Thereafter, the slave processor 4 finishes the execution of the task (Step S342 in FIG. 8). Then, it is checked whether or not other interrupt requests exist (Step S352 in FIG. 8). When there is no other interrupt, the interrupt among processors disable judgment logic for master processor 110 sets the B2 bit 202 of the interrupt among processors control register for master processor 20 to "1". As a result, the interrupt process is not performed, and the flow returns to the step S352 while being in an acceptance waiting state (Step S354 in FIG. 8). When other interrupt requests exist, the interrupt among processors disable judgment logic for master processor 110 sets the B2 bit 202 of the interrupt among processors control register for master processor 20 to "0" (Step S353 in FIG. 8). By this means, the interrupt among processors request control logic for master processor 100 sends the interrupt among processors request signal to the priority ranking judgment logic for master processor 170 (Step S343 in FIG. 8).

Thereafter, the OS finishes the task through the steps S344 to S347 in FIG. 8, performs the rescheduling, thereby managing the process order of the tasks to be subsequently processed (Step S360 in FIG. 8). Note that the priority level of the interrupt among processors can be arbitrarily determined based on the information of the B3 bit 203 of the interrupt among processors control register for master processor 20.

Subsequently, it is checked whether other interrupt requests exist (Step S370 in FIG. 8). When there is no other interrupt, the OS sets the B1 bit 201 of the interrupt among processors control register for master processor 20 to "0" (Step S371 in FIG. 8), thereby withdrawing the interrupt among processors request. Meanwhile, when they exist, the interrupt among processors request signal is directly outputted. Therefore, the interrupt among processors request control logic for master processor 100 outputs the interrupt among processors request signal to the priority ranking judgment logic for master processor 170 (Step S380 in FIG. 8).

Then, in the same manner as that of the case in FIG. 5, the OS starts a task through the steps S344 to S347, and it sets the B1 bit 201 of the interrupt among processors control register for master processor 20 to "0" (Step S385 in FIG. 8), thereby withdrawing the interrupt among processors request. Thereafter, the flow advances to the steps after the step S320 in FIG. 4.

Figure 9:
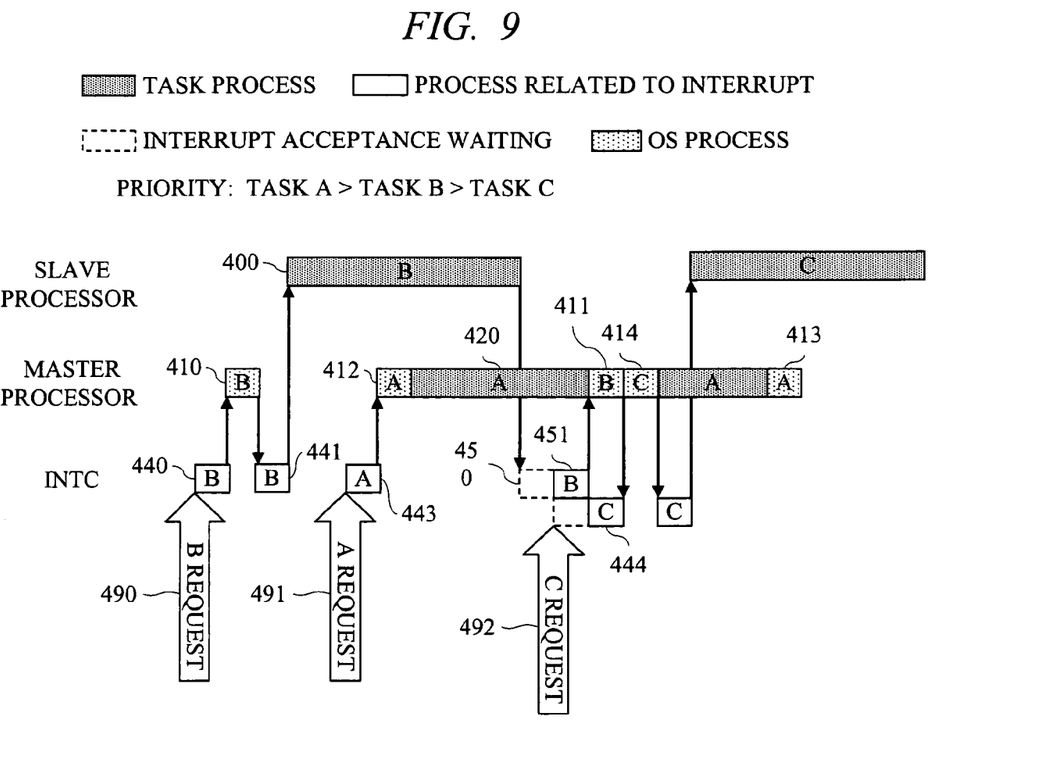
FIG. 9 is a diagram showing a flow of interrupt allocation process in the master-slave configuration in the multi-processor system according to the second embodiment of the present invention.

Next, the process flow of the interrupt allocation in the master-slave configuration according to the second embodiment will be described with reference to FIG. 9. In FIG. 9, a task A is taken to be the highest in priority, and the priority is high in order of a task B and a task C. Also, it is assumed that the slave processor is started from a non-activated state. Furthermore, in FIG. 9, the same reference numerals and characters as those shown in FIG. 6 and FIG. 7 denote the same parts. The description of the same parts as those in FIG. 6 and FIG. 7 is omitted, and the process after the finish of 400 which is different from those of FIG. 6 and FIG. 7 will be described below.

When the execution of the task B processed by the slave processor 4 is finished while the master processor 3 is executing the task A, an interrupt among processors from the slave processor 4 to the master processor 3 is requested according to the operational flow in the order of the steps S351 and S342 in FIG. 8. Thereafter, since other interrupt requests do not exist according to the step S352 in FIG. 8, the flow does not proceed to the steps after the step S353 in FIG. 8. Then, at the step S354 in FIG. 8, the interrupt among processors mask signal to the master processor 3 is set to mask the interrupt among processors, and then the flow returns to the step S352 in FIG. 8. When other interrupt requests exist, at 451, the interrupt among processors mask signal from the slave processor 4 to the master processor 3 is withdrawn and an interrupt among processors signal is requested to the master processor 3 according to the operational flow in the order of the steps S353, S343 to S347 in FIG. 8.

Thereafter, the OS performs the finish process of the task A and the rescheduling is performed at 411. In parallel with that, since the interrupt requests for the other tasks C exist, the flow advances to the steps after the step S380 in FIG. 8, and the request for interrupt among processors corresponding to the task C is outputted at 444. Note that, since the interrupt among processors request bit is not masked, the interrupt among processors request has been kept outputted. Also, since the priority level for the task C is replaced with the priority level of the interrupt among processors, it is the highest in priority among the maskable interrupts.

Then, after the interrupt among processors request is outputted again to the master processor 3 according to the operational flow of the steps S344 to S347 in FIG. 8, the OS starts the task C at 414 to withdraw the interrupt among processors request bit. Subsequently, the available slave processor executes the process of the task C according to the operational flow after the step S320 in FIG. 4.

As described above, even when the master processor 3 executes a task higher in priority than the slave processor 4, the interrupt requests for performing the task lower in priority are not kept in a waiting state. Therefore, it is possible to reduce the whole interrupt processing time and further improve the real-time performance. Note that the task finish process of the OS in the slave processor 4 which has already terminated the task process is kept into a waiting state until an interrupt request corresponding to the process for other tasks lower in priority are generated, and it may seem to occupy the resource of the slave processor 4. However, unless the interrupt process is newly requested, the slave processor 4 is not used. Therefore, it is considered that there may be no influence even if the task finish process of the OS in the slave processor is kept in a waiting state.

Also, in the second embodiment described above, the priority of the interrupt among processors is uniquely determined and it is the highest priority among the maskable interrupts. However, by setting the B3 bit 203 of the interrupt among processors control register for master processor 20, it becomes possible to arbitrary determine the priority of the interrupt among processors. For example, when it is desired to process a high priority task processed by the master processor 3 with the highest priority, the priority of the interrupt among processors is set lower than that of a task being processed by the master processor. By this means, the process can be performed without interrupting the high priority task processed by the master processor 3 as shown in the task process flow in FIG. 6. On the contrary, when it is desired to allocate the process for a low priority task to the slave processor 4 while the master processor 3 is executing a high priority task, the priority of the interrupt among processors is set higher than that of a task being processed by the master processor 3. By this means, it becomes possible to receive the interrupt among processors request immediately and make the slave processor 4 execute the low priority task.

As described above, since the priority level of the interrupt among processors can be arbitrarily changed, it is possible to control the allocation of interrupt processes as desired between the master processor 3 and the slave processor 4.

In the foregoing, the invention made by the inventors of the present invention has been concretely described based on the embodiments. However, it is needless to say that the present invention is not limited to the foregoing embodiments and various modifications and alterations can be made within the scope of the present invention.

According to the embodiments described in the specification, the efficient allocation of the interrupt processes between the master and the slave processors in the multi-processor system with the master-slave configuration can be achieved. Therefore, a real-time performance can be improved.

The present invention can be applied to a multi-processor system using a semiconductor integrated circuit.

What is claimed is:

1. A multi-processor system comprising:
   a master processor provided with an operating system;
   a slave processor operating according to instructions from said master processor;
   a plurality of on-chip peripheral circuits; and
   an interrupt controller for receiving an interrupt request from an external circuit or said on-chip peripheral circuits,
   wherein a task process based on said interrupt request is allocated to and processed in said master processor or said slave processor,
   wherein, when an interrupt process request lower in priority is generated while said master processor is executing an interrupt process higher in priority, said interrupt controller interrupts the process of said master processor through an interrupt among processors and allocates the interrupt process lower in priority to said slave processor; and
   wherein said interrupt among processors is highest in priority level among maskable interrupts.

2. The multi-processor system according to claim 1, further comprising:
   an interrupt among processors control register;
   wherein said interrupt controller outputs an interrupt request from said master processor to said slave processor based on information in said interrupt among processors control register when the interrupt request is generated while any of said master processor and said slave processor is in a state of waiting for process execution.

3. The multi-processor system according to claim 1,
   wherein said interrupt controller has an interrupt among processors disable judgment logic for said master processor, and when said slave processor finishes the interrupt process after said master processor has executed an interrupt process higher in priority and said slave processor has executed an interrupt process lower in priority respectively in parallel, said interrupt among processors disable judgment logic for said master processor determines whether or not other interrupt requests exist and determines an output of an interrupt request from said slave processor to said master processor based on the result thereof.

4. The multi-processor system according to claim 2,
   wherein a bit for disabling the interrupt among processors retained in said interrupt among processors control register is updated according to the determination result by said interrupt among processors disable judgment logic for said master processor.

5. The multi-processor system according to claim 2,
   wherein said interrupt among processors control register has a bit for retaining a priority level of the interrupt among processors and said interrupt controller arbitrarily sets the priority level of the interrupt among processors, thereby selecting the presence or absence of the interrupt among processors request.

* * * * *